(12) United States Patent
Yu et al.

(10) Patent No.: US 10,779,171 B2
(45) Date of Patent: Sep. 15, 2020

(54) DOWNLINK SPATIAL TRANSMISSION AND SPATIAL RECEPTION MECHANISM IN MULTI-BEAM OPERATION

(71) Applicant: MEDIATEK INC., Hsinchu (TW)

(72) Inventors: Chia-Hao Yu, Hsinchu (TW); Ming-Po Chang, Hsinchu (TW); Chiou-Wei Tsai, Hsinchu (TW); Chien-Hwa Hwang, Hsinchu (TW); Jiann-Ching Guey, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/127,481

(22) Filed: Sep. 11, 2018

(65) Prior Publication Data

US 2019/0082335 A1    Mar. 14, 2019

Related U.S. Application Data

(60) Provisional application No. 62/556,911, filed on Sep. 11, 2017, provisional application No. 62/566,785, filed on Oct. 2, 2017.

(51) Int. Cl.
*H04W 24/04* (2009.01)
*H04W 74/08* (2009.01)
(Continued)

(52) U.S. Cl.
CPC .......... *H04W 24/04* (2013.01); *H04B 7/0695* (2013.01); *H04B 7/088* (2013.01);
(Continued)

(58) Field of Classification Search
CPC .. H04W 24/04; H04W 74/0833; H04W 16/28
See application file for complete search history.

(56) References Cited

U.S. PATENT DOCUMENTS

| 2013/0155847 A1* | 6/2013 | Li | H04W 24/04 370/225 |
|---|---|---|---|
| 2016/0353510 A1 | 12/2016 | Zhang et al. | 370/329 |

(Continued)

FOREIGN PATENT DOCUMENTS

| CN | 107079459 A | 8/2015 |
|---|---|---|
| WO | WO2017151876 A1 | 3/2016 |

OTHER PUBLICATIONS

International Search Report and Written Opinion of International Search Authority for PCT/CN2018/105100 dated Oct. 31, 2018 (8 pages).

(Continued)

*Primary Examiner* — Rasheed Gidado
(74) *Attorney, Agent, or Firm* — Imperium Patent Works; Zheng Jin (57) ABSTRACT

A method of beam failure recovery request (BFRQ) transmission is proposed. UE can search for UE-specific control channel in a search space that is signaled specifically for monitoring network response of the BFRQ. Furthermore, configurations indicated specifically for BFRQ can be carried by dedicated signaling such as high-layer radio resource control (RRC) signaling. After successfully rebuilding connection, UE assumes the demodulation reference signal (DMRS) ports of UE-specific control channel to be spatially quasi-co-located (QCL-ed) with the reference signals identified during the beam failure recovery procedure.

20 Claims, 6 Drawing Sheets

(51) Int. Cl.
*H04W 16/28* (2009.01)
*H04B 7/06* (2006.01)
*H04W 76/19* (2018.01)
*H04B 7/08* (2006.01)

(52) U.S. Cl.
CPC ....... *H04W 16/28* (2013.01); *H04W 74/0833* (2013.01); *H04W 76/19* (2018.02)

(56) References Cited

U.S. PATENT DOCUMENTS

| | | | |
|---|---|---|---|
| 2017/0231011 A1 | 8/2017 | Park et al. | |
| 2017/0346545 A1* | 11/2017 | Islam | H01Q 1/245 |
| 2018/0138962 A1* | 5/2018 | Islam | H04L 5/0048 |
| 2018/0219604 A1* | 8/2018 | Lu | H04B 7/0695 |
| 2018/0227102 A1* | 8/2018 | John Wilson | H04B 7/0408 |
| 2018/0367374 A1* | 12/2018 | Liu | H04W 76/18 |
| 2018/0368124 A1* | 12/2018 | Liu | H04W 72/0413 |
| 2018/0375556 A1* | 12/2018 | Wang | H04B 7/061 |
| 2019/0053314 A1* | 2/2019 | Zhou | H04B 7/0695 |
| 2019/0075600 A1* | 3/2019 | Kwon | H04W 74/0833 |

OTHER PUBLICATIONS

R1-1710185 3GPP TSG RAN WG1 NR Ad-Hoc#2, ZTE, "Discussion on beam recovery mechanism", Qiandao, P.R. China, Jun. 27-30, 2017 (9 pages) *p. 2 to p. 7*.
Taiwan IPO, office action for the TW patent application 107131934 (no English translation is available) dated Aug. 19, 2019 (8 pages).
R1-1713047 3GPP TSG RAN WG1 Meeting #90, Spreadtrum Communication, "Discussion on UE initiated recovery from beam failure", Prague, Czech Republic, dated Aug. 21-25, 2017 (6 pages).
R1-1712552 3GPP TSG RAN WG1 Meeting #90, Intel Corp., "Discussion for Mechanism to Recover from Beam Failure", Prague, Czech Republic, Aug. 21-25, 2017 (9 pages).
R1-1712224 3GPP TSG RAN WG1 Meeting #90, Huawei et al., "Procedure Details for Beam Failure Recovery", Prague, Czech Republic, Aug. 21-25, 2017 (12 pages).

* cited by examiner

DOWNLINK SPATIAL TRANSMISSION AND SPATIAL RECEPTION MECHANISM IN MULTI-BEAM OPERATION

CROSS REFERENCE TO RELATED APPLICATIONS

This application claims priority under 35 U.S.C. § 119 from U.S. Provisional Application No. 62/556,911, entitled "Mechanism in Transition Phase for Beam Management," filed on Sep. 11, 2017; U.S. Provisional Application No. 62/566,785, entitled "Mechanism to Receive NW Response for Beam Failure Recovery Request Transmission in Multi-beam Operation," filed on Oct. 2, 2017, the subject matter of which is incorporated herein by reference.

TECHNICAL FIELD

The disclosed embodiments relate generally to wireless communication, and, more particularly, to beam recovery request transmission and beam management transition phase mechanism in a Millimeter Wave (mmW) beamforming new radio (NR) system.

BACKGROUND

The bandwidth shortage increasingly experienced by mobile carriers has motivated the exploration of the under-utilized Millimeter Wave (mmWave) frequency spectrum around 30 G and 300 GHz for the next generation broadband cellular communication networks. The available spectrum of mmWave band is hundreds of times greater than the conventional cellular system. The mmWave wireless network uses directional communications with narrow beams and can support multi-gigabit data rate. The underutilized bandwidth of the mmWave spectrum has very small wavelengths, which enables large number of miniaturized antennas to be placed in a small area. Such miniaturized antenna system can produce high beamforming gains through electrically steerable arrays generating directional transmissions. With recent advances in mmWave semiconductor circuitry, mmWave wireless system has become a promising solution for real implementation. However, the heavy reliance on directional transmissions and the vulnerability of the propagation environment present particular challenges for the mmWave network with beamforming.

In principle, beam training mechanism, which includes both initial beam alignment and subsequent beam tracking, ensures that base station (BS) beam and user equipment (UE) beam are aligned for data communication. To ensure beam alignment, beam-tracking operation should be adapted in response to channel changes. However, in mmWave systems, transmission path lifetime is expected one order of magnitude shorter than traditional cellular bands due to wavelength difference. Combined with dedicated beam with small spatial coverage, the number of effective transmission paths for a dedicated beam could be rather limited, thus more vulnerable to UE movements and environmental changes.

Beam failure recovery mechanism is designed to handle the rare case beam tracking issue, e.g., when feedback rate for beam management may not be frequent enough. Beam recovery mechanism comprises triggering condition evaluation including beam failure detection and candidate beam identification, beam failure recovery request (BFRQ) transmission, and network response monitoring. Details of the beam failure recovery procedures need to be carefully designed to shorten the recovery delay while ensure the robustness. Specifically, details on BFRQ transmission and resource, and details on where and how to deliver network response need to be carefully designed.

The beam pair link (BPL) used for network-UE communication is controlled by the network. After UE recovers from beam failure, radio link failure, or handover procured, but before the network can provide regular beam indication signaling, a default BPL is required for NW-UE communication. The default BPL includes TX beam and an RX beam, which requires common understanding at both cell and UE to construct a valid default BPL. Mechanism is needed to acquire the default BPL.

SUMMARY

A method of beam failure recovery request (BFRQ) transmission is proposed. Under a 4-step BFR procedure, UE first detects a beam failure condition of the original serving beam pair link (BPL). UE also performs measurements for candidate BPL selection. Next, UE transmits a beam failure recovery request (BFRQ) message upon the triggering condition for BFRQ transmission is satisfied. Finally, UE monitors network response to decide the success or failure of the BFR attempt. In accordance with one novel aspect, UE can search for UE-specific control channel in a search space that is signaled specifically for monitoring network response of the BFRQ. Furthermore, configurations indicated specifically for BFRQ can be carried by dedicated signaling such as high-layer radio resource control (RRC) signaling. After successfully rebuilding connection, UE assumes the demodulation reference signal (DMRS) ports of UE-specific control channel to be spatially quasi-co-located (QCL-ed) with the reference signals identified during the beam failure recovery procedure.

In one embodiment, a UE receives a high-layer configuration from a base station in a beamforming communication network. The UE detects a beam failure condition of serving beam pair links (BPLs) and identifying a candidate beam pair link (BPL) by monitoring reference signals derived from the high-layer configuration. The UE determines a set of beam failure recovery request (BFRQ) parameters and a search space based on the high-layer configuration. The UE transmits a BFRQ using a random-access channel (RACH) procedure with the set of BFRQ parameters and monitoring the network response in the search space using the candidate BPL.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
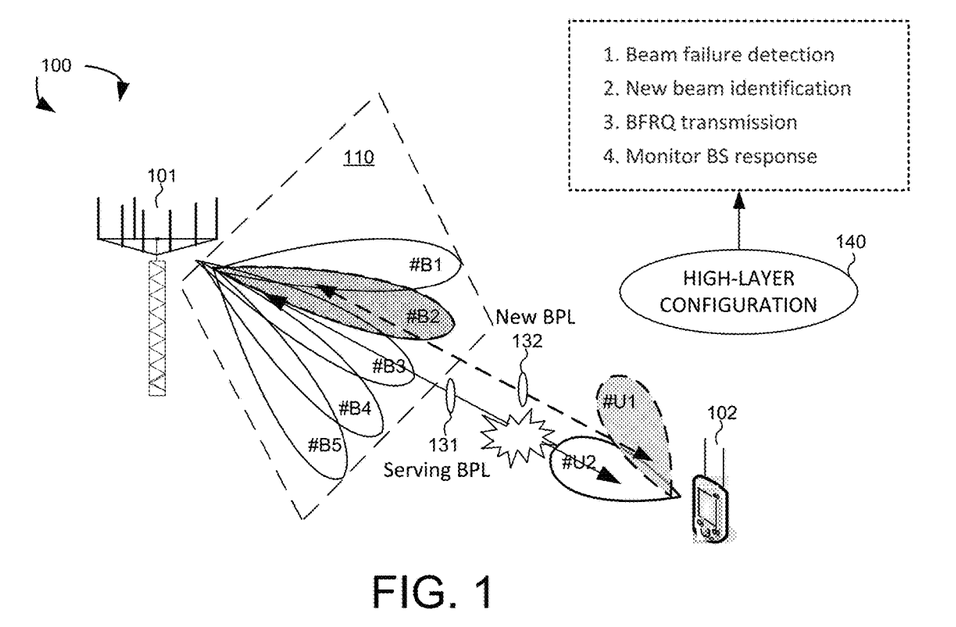
FIG. 1 illustrates a beamforming wireless communication system supporting a four-step beam failure recovery procedure in accordance with one novel aspect.

FIG. 1 illustrates a beamforming wireless communication system 100 supporting a four-step beam failure recovery procedure in accordance with one novel aspect. Beamforming mmWave mobile communication network 100 comprises a base station BS 101 and a user equipment UE 102. The mmWave cellular network uses directional communications with beamformed transmission and can support up to multi-gigabit data rate. Directional communications are achieved via digital and/or analog beamforming, wherein multiple antenna elements are applied with multiple sets of beamforming weights to form multiple beams. In the example of FIG. 1, BS 101 is directionally configured with multiple cells, and each cell is covered by a set of TX/RX beams. For example, cell 110 is covered by a set of five BS beams # B1, # B2, # B3, # B4, and # B5. The collection of the BS beams # B1-# B5 covers an entire service area of cell 110. Similarly, UE 102 may also apply beamforming to form multiple UE beams, e.g., # U1 and # U2.

The set of BS beams may be periodically configured or occur indefinitely and repeatedly in order known to the UEs. Each BS beam broadcasts minimum amount of cell-specific and beam-specific information similar to System Information Block (SIB) or Master Information Block (MIB) in LTE systems, or synchronization signal block (SSB) in NR systems. Each BS beam may also carry UE-specific control or data traffic. Each BS beam transmits a set of known reference signals for the purpose of initial time-frequency synchronization, identification of the beam that transmits the signals, and measurement of radio channel quality for the beam that transmits the signals. In one example, a hierarchical control beam and dedicated data beam architecture provides a robust control-signaling scheme to facilitate the beamforming operation in mmWave cellular network systems.

In principle, beam training mechanism, which includes both initial beam alignment and subsequent beam tracking, ensures that BS beam and UE beam are aligned for data communication. For beamformed access, both ends of a link need to know which beamformers to use, e.g., a beam pair link (BPL). In downlink (DL)-based beam management, the network (NW) side provides opportunities for UE to measure beamformed channel of different combinations of BS beams and UE beams. Apparently, UE has the most up-to-date beamformed channel state in DL-based beam management. NW learns the beamformed channel state based on UE feedback. The feedback rate for beamformed channel state is selected to take care of most beam tracking need. For rare cases beam tracking issue, however, such feedback rate for beam management may not be frequent enough. For example, a sudden blockage may result in lost connection. An additional mechanism is thus desired to address the need from rare cases.

A four-step beam failure recovery (BFR) procedure can be used to address the issue. In a first step of beam failure detection, UE 102 detects a beam failure condition of the original serving BPL 131 formed between BS beam # B3 and UE beam # U2. In a second step of new candidate beam identification, UE 102 performs measurements for candidate beam selection. In a third step of beam failure recovery request (BFRQ) transmission, UE 102 transmits a BFRQ message to BS 101 upon the triggering condition for BFRQ transmission is satisfied. For example, the triggering condition is satisfied when beam failure is detected (e.g., the quality of the serving BPL is worse than a first predefined threshold) and candidate beam is identified (e.g., the quality of the candidate BPL is better than a second predefined threshold). In a fourth step of monitoring NW response, UE 102 monitors NW response to decide the success or failure of the BFRQ transmission attempt. For example, if the BFRQ transmission attempt is successful, then a new BPL 132 formed between BS beam # B2 and UE beam # U1 is selected to become the new serving BPL between BS 101 and UE 102.

In one advantageous aspect, UE can search for UE-specific control channel in a search space that is signaled specifically for monitoring NW response of a BFRQ via a high-layer signaling (140). Furthermore, configurations indicated specifically for BFRQ can be carried by the high-layer, e.g., radio resource control (RRC) signaling. After successfully rebuilding connection, UE assumes the demodulation reference signal (DMRS) ports of UE-specific control channel to be spatially quasi-co-located (QCL-ed) with the reference signals identified during the beam failure recovery procedure.

Figure 2:
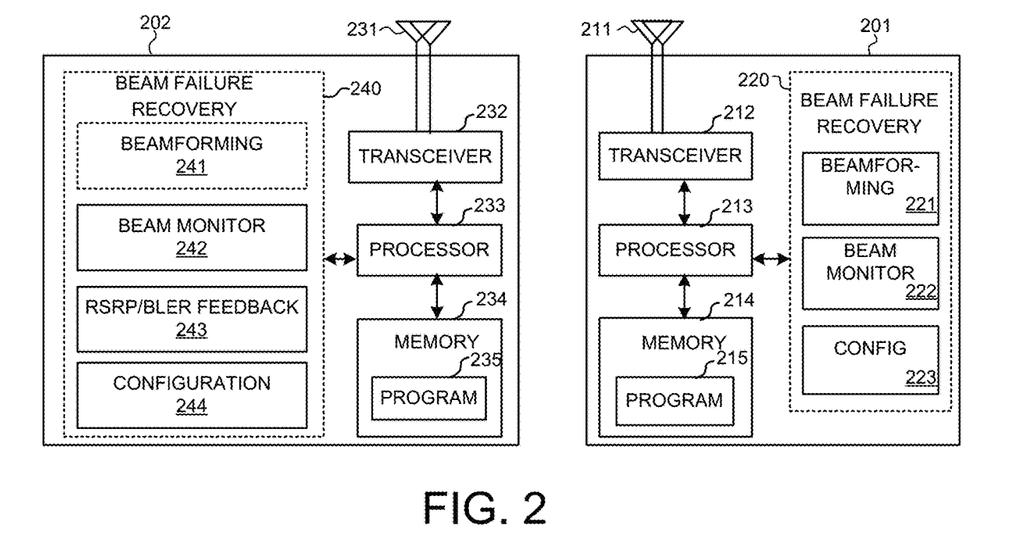
FIG. 2 is a simplified block diagram of a base station and a user equipment that carry out certain embodiments of the present invention.

FIG. 2 is a simplified block diagram of a base station and a user equipment that carry out certain embodiments of the present invention. BS 201 has an antenna array 211 having multiple antenna elements that transmits and receives radio signals, one or more RF transceiver modules 212, coupled with the antenna array, receives RF signals from antenna 211, converts them to baseband signal, and sends them to processor 213. RF transceiver 212 also converts received baseband signals from processor 213, converts them to RF signals, and sends out to antenna 211. Processor 213 processes the received baseband signals and invokes different functional modules to perform features in BS 201. Memory 214 stores program instructions and data 215 to control the operations of BS 201. BS 201 also includes multiple function modules and circuits that carry out different tasks in accordance with embodiments of the current invention.

Similarly, UE 202 has an antenna 231, which transmits and receives radio signals. A RF transceiver module 232, coupled with the antenna, receives RF signals from antenna 231, converts them to baseband signals and sends them to processor 233. RF transceiver 232 also converts received baseband signals from processor 233, converts them to RF signals, and sends out to antenna 231. Processor 233 processes the received baseband signals and invokes different functional modules to perform features in UE 202. Memory 234 stores program instructions and data 235 to control the operations of UE 202. UE 202 also includes multiple function modules and circuits that carry out different tasks in accordance with embodiments of the current invention.

The functional modules and circuits can be implemented and configured by hardware, firmware, software, and any combination thereof. For example, BS 201 comprises a beam failure recovery module 220, which further comprises a beamforming circuit 221, a beam monitor 222, and a configuration circuit 223. Beamforming circuit 221 may belong to part of the RF chain, which applies various beamforming weights to multiple antenna elements of antenna 211 and thereby forming various beams. Beam monitor 222 monitors received radio signals and performs measurements of the radio signals over the various beams. Configuration circuit 223 configures radio resources and BFRQ parameters as well as search spaces for UE to transmit BFRQ and to monitor NW response.

Similarly, UE 202 comprises a beam failure recovery module 240, which further comprises a beamforming circuit 241, a beam monitor 242, a RSRP/BLER (reference signal received power or block error rate) feedback circuit 243, a configuration circuit 244, and a PUCCH handling circuit 245. Beamforming circuit 241 may belong to part of the RF chain, which applies various beamforming weights to multiple antenna elements of antenna 231 and thereby forming various beams. Beam monitor 242 monitors received radio signals and performs measurements of the radio signals over the various beams and maintains a ranking of its preferred BPLs. RSRP/BLER feedback circuit 243 provides beam quality feedback information to BS 201 for BPL alignment status determination. Configuration circuit 244 receives beam failure recovery configuration from BS 201, which includes beam failure recovery trigger conditions, beam failure recovery resources, and UE monitor/report behavior. Configuration circuit 244 also receives resource allocation and BFRQ parameters from BS 201 for BFRQ transmission as well as search spaces for NW response monitoring.

Figure 3:
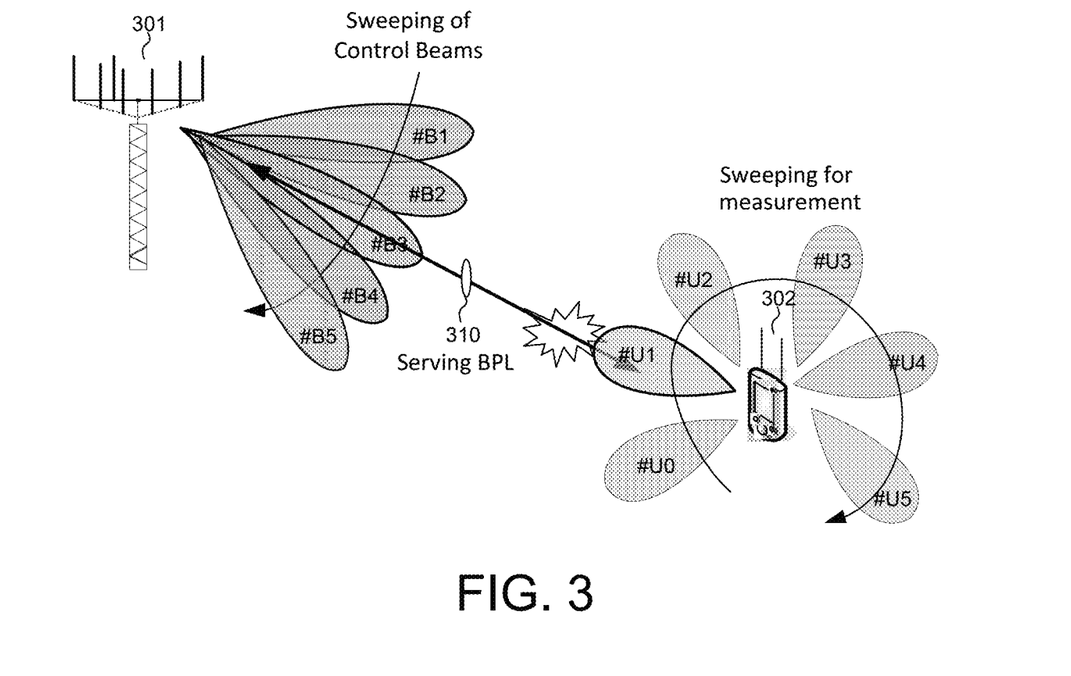
FIG. 3 illustrates beam failure detection and new beam identification in a four-step beam failure recovery procedure.

FIG. 3 illustrates beam failure detection and new beam identification in a four-step beam failure recovery procedure. In the example of FIG. 3, BS 301 is a serving base station for UE 302 and establishes a serving beam pair link (BPL) 310 with UE 302 for data communication. The serving BPL is associated to a serving control channel, e.g., a physical downlink control channel (PDCCH). One triggering condition for beam failure recovery is a beam failure detection of the serving BPL. Note that more than one serving BPLs may be used as serving control channels between the BS and the UE. In such case, beam failure recovery is triggered when all serving control channel fails. In one example, the beam failure is detected when the Block Error Rate (BLER) of the serving BPL is worse than a predefined threshold.

Another triggering condition for beam failure recovery is a candidate beam monitoring and new beam identification. In general, UE monitoring behavior follows similar procedure as DL beam management procedure in multi-beam operation. As depicted by FIG. 3, BS 301 transmits periodic DL RS by using a set of provisioned BS control beams # B1-# B5 with moderate beamforming gain. Individual beam-specific reference signals are transmitted in TDM/FDM/CDM (time division multiplex, frequency division multiplexed, or code division multiplexed) manner or a combination of them. UE 302 monitors the quality of combinations of BS-UE BPLs in background by sweeping through different UE beams # U0-# U5. The beam quality is measured based on UE-specifically configured CSI-RS resources and/or SSB resources. The measurement metric for candidate beam selection is layer-1 reference signal received power (L1-RSRP). A new candidate BPL is identified when the L1-RSRP of the new candidate BPL is above a predefined threshold. UE 302 keeps a ranking of its preferred candidate BPLs and can later select from the preferred candidate BPLs that are not currently used for beam failure recovery purpose.

Figure 4:
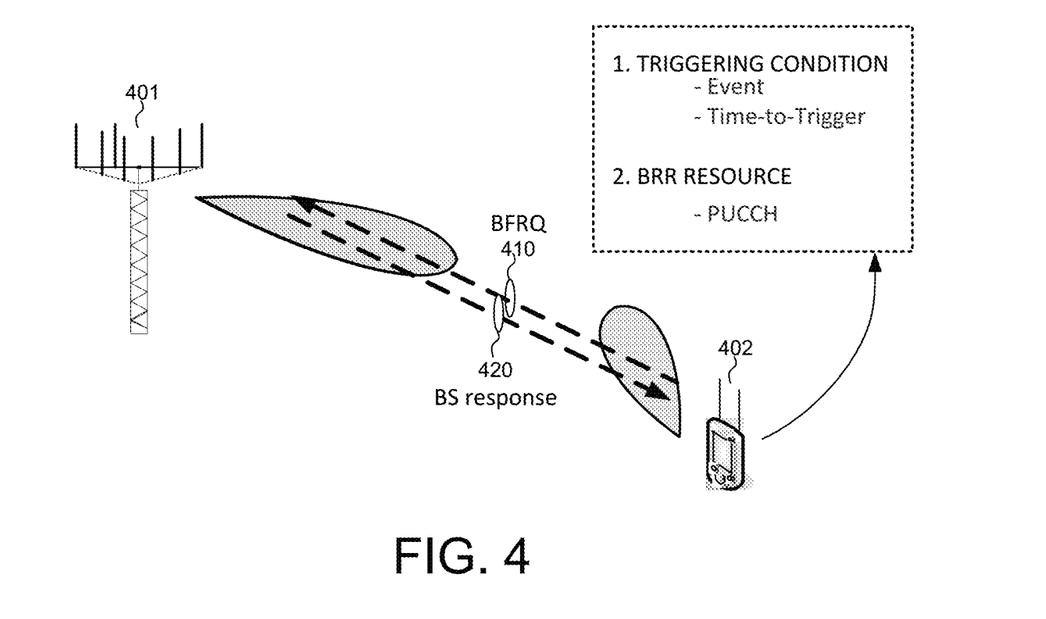
FIG. 4 illustrates beam failure recovery request transmission and response monitoring in a four-step beam failure recovery procedure.

FIG. 4 illustrates beam failure recovery request (BFRQ) transmission and response monitoring in a four-step beam failure recovery procedure. The BFRQ transmission involves two aspects, the first is the trigger condition, and the second is the selection of BFRQ resources. Triggering UE-initiated transmission for beam failure recovery requires UE to monitor both serving BPL(s) and good BPL(s) currently not used for communication. Both absolute and relative thresholds similar to RRC measurement events can be used. In one embodiment, the triggering condition for beam failure recovery is satisfied when the serving is worse than a first threshold and the candidate is better than a second threshold. Time-to-trigger can be applied for event evaluation, i.e., event criteria should be satisfied for a certain amount of time before triggering beam failure recovery request.

Once the triggering condition is satisfied for a predefined evaluation period, UE 402 transmits a Beam Failure Recovery reQuest (BFRQ) 410 to BS 401 over beam failure recovery resources. In one embodiment, UE 402 is configured with dedicated beam failure recovery resource, e.g., UL control channel similar to LTE PUCCH. The dedicated resources correspond to individual BS receiving beams, e.g., individual PUCCHs for individual BS receiving beams for a UE. The dedicated resources carry information required for beam failure recovery action, e.g., DL BS beam ID of candidate BPL where beam failure recovery is to take place, triggered event (if multiple recovery events are configured), and candidate beam quality information. Selected candidate BPL can be associated with dedicated beam failure recovery resources directly/indirectly. UE beam used for BFRQ transmission depends on UE beam correspondence. Upon beam failure recovery request reception by BS 401, the network transmits a response 420 back to UE 402 and attempts connection with UE 402 in UE-indicated BPL.

From NW perspective, the BS response is transmitted by the UE-identified beam. From UE perspective, UE selects a UE RX beam that can received the UE-identified beam properly. NW and UE should have common understanding on how the response can take place. The BS response to BFRQ can be delivered by a unicast or multicast signal. Example of unicast signaling: gNB response can be delivered in a dedicated control channel addressed (scrambled) to a UE-specific identity (e.g., C-RNTI in LTE)—applicable to dedicated PRACH-based BFRQ. Example of multicast signaling: gNB response can be delivered in a common control channel addressed (scrambled) to an identity that is derived from time-frequency resources used for BFRQ transmission (e.g., RA-RNTI in LTE)—applicable to contention-based PRACH for BFRQ.

Figure 5:
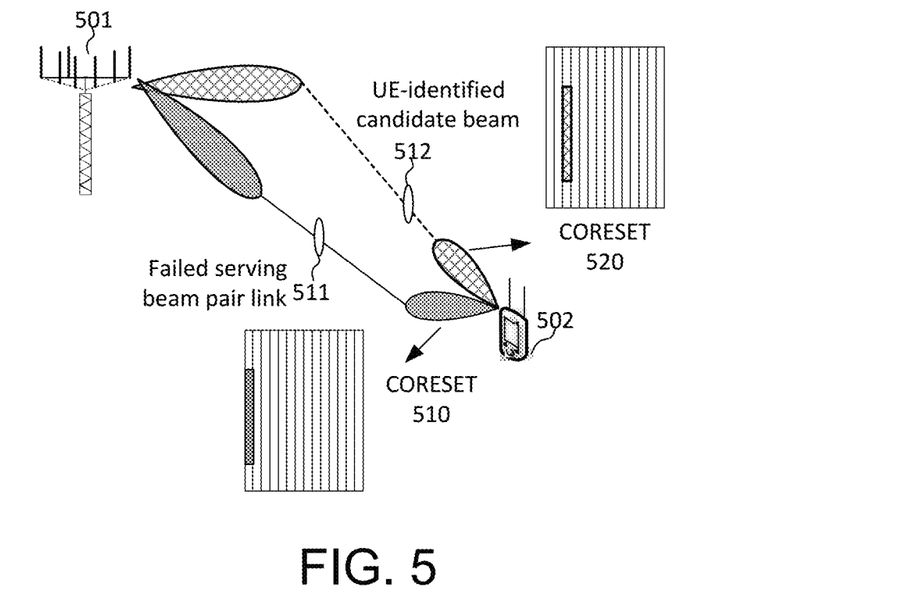
FIG. 5 illustrates a first embodiment of delivery for network response in a beam failure recovery procedure in accordance with a novel aspect.

FIG. 5 illustrates a first embodiment of delivery for network response in a beam failure recovery procedure in accordance with a novel aspect. UE 502 receives the response from BS 501 by searching in a configured search space or control resource set (CORESET) corresponding to the UE-identified beam. UE can search for UE-specific control channel in a CORESET that is the same as the CORESET used for monitoring RACH RAR. The RAR CORESET is carried in SIB, e.g., in remaining minimum system information (RMSI). UE can search for UE-specific control channel in a CORESET that is signaled specifically for monitoring NW response of a BFRQ. The signaling can be in broadcast channel (e.g., system information), or in dedicated channel (e.g., dedicated RRC message). As illustrated in FIG. 5, CORESET on UE-identified candidate beam 520 can be the same as the CORESET for monitoring RAR, or can be additionally indicated either in broadcast or dedicated channel.

Figure 6:
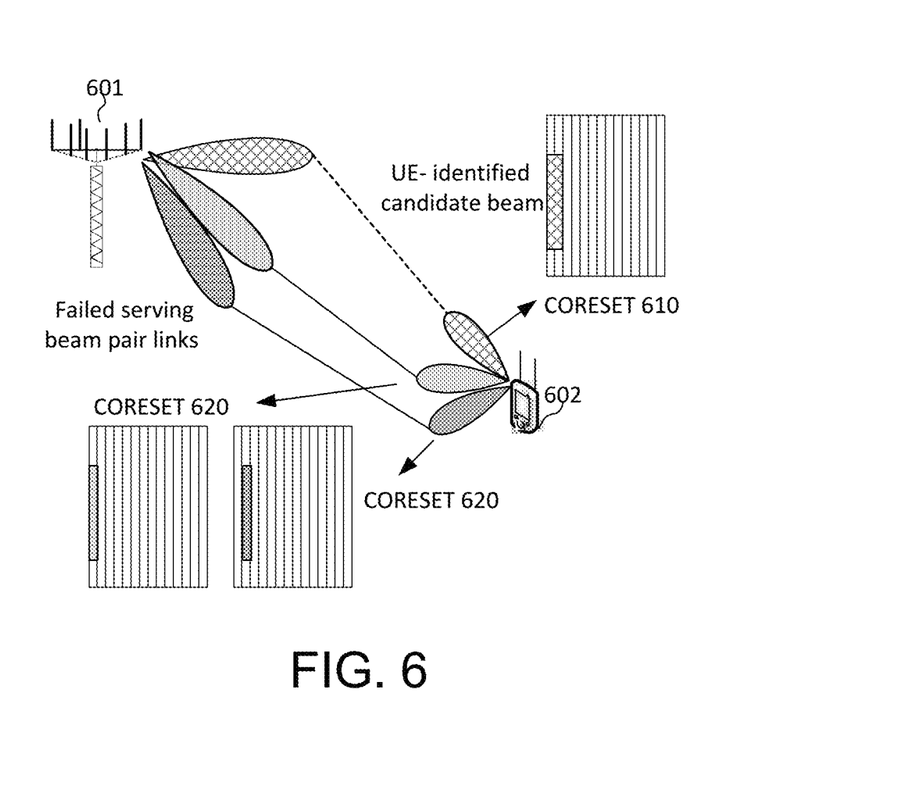
FIG. 6 illustrates a second embodiment of delivery for network response in a beam failure recovery procedure in accordance with a novel aspect.

FIG. 6 illustrates a second embodiment of delivery for network response in a beam failure recovery procedure in accordance with a novel aspect. UE 602 can search for UE-specific control channel in a CORESET that include aggregated resource elements of all its configured CORESETs by BS 601 before BFRQ is triggered. In one example, if UE is configured with one serving beam pair link for monitoring its control channel, the same CORESET is used for monitoring BFRQ NW response, but on the UE-identified candidate beam. In another example, if UE is configured with two serving beam pair links for monitoring its control channels, both CORESETs configured for monitoring its control channels are used for monitoring BFRQ NW response, but on the UE-identified candidate beam. As illustrated in FIG. 6, CORESET on UE-identified candidate beam can be the union of previously monitored CORESETs, e.g., the union of CORESET 610, 620, and 630.

Note that for CORESET configuration for monitoring BS response, the similar configuration parameters as for PDCCH CORESET can be used, with the following additional consideration. BS response is monitoring within an observation window after beam failure recovery request transmission is sent. Thus, an observation window is additionally needed, and the original CORESET periodicity parameter can be ignored.

For the case that BS response is searched over a dedicatedly signaled CORESET by UE, the CORESET can be simply one of the CORESET(s) that is monitored before beam failure. DMRS antenna port(s) of each PDCCH is associated with corresponding CORESET configuration by e.g., dedicated RRC signaling. DMRS antenna port(s) of a PDCCH is spatially QCL-ed to one or more DL RS (CSI-RS or SS-block) that are used for beam management, e.g., by Transmission Configuration Indication (TCI) state(s). In one example, two PDCCHs carry individual CORESET configurations. To signal UE with a dedicated CORESET for BS response, when it is one of the two CORESETs, DMRS ports information of one PDCCH can be indicated. Based on DMRS ports information, UE can apply corresponding CORESET configuration for BS response monitoring.

Configurations for BFRQ using contention-free can follow those in RACH configuration by default if not indicated specifically. By specific indication, newly signaled configuration can overwrite the corresponding subset of configuration in RACH configuration and/or signal additional configurations for BFRQ. Configurations indicated specifically for BFRQ can be carried by dedicated signaling such high-layer RRC signaling. Configurations indicated specifically for BFRQ can include information for any combination of the following: Preamble index dedicated for the UE; Cyclic shift configuration value-a parameter similar to LTE RRC parameter zeroCorrelationZoneConfig; Preamble root sequence index—a parameter similar to LTE RRC parameter rootSequenceIndex; Preamble indices/time-frequency resource allocation dedicated for BFRQ; Association between BFRQ preamble indices/time-frequency resources and the configured DL reference signal for new beam identification; and Information for pathloss estimation/update for BFRQ.

Preamble indices/time-frequency resource allocation dedicated for BFRQ can be separately indicated from those indicated by RACH configuration. For example, RACH configuration indicates the available preamble indices/time-frequency resources for all RACH related use cases such as RACH and on-demand SI request and so on but except for BFRQ. Depending on use scenarios, the transmission can be done in a contention-free or contention-based manner. BFRQ specific indication or signaling can indicate the information of available preamble indices/time-frequency resources dedicated for BFRQ. Alternatively, Preamble indices/time-frequency resources dedicated for BFRQ are a subset of those indicated by RACH configuration.

A set of beams can be configured for candidate beam identification purpose. Based on the UE-identified candidate beam, a corresponding BFRQ resource(s) can be determined. The corresponding BFRQ resource(s) can be directly associated with the UE-identified candidate beam (via the corresponding DL RS). The DL RS can be e.g., SS-block or CSI-RS. The corresponding BFRQ resource(s) can be indirectly associated with the UE-identified candidate beam. The DL RS of the UE-identified candidate beam is associated (e.g., spatial QCL-ed) with a second DL RS, and the second DL RS is directly associated with BFRQ resource(s). The second DL RS can be of different type from the DL RS. For example, the DL RS is CSI-RS and the second DL RS is SS-block.

Using non-contention PRACH channel for BFRQ transmission, a dedicated PRACH preamble can be signaled to UE as locally unique identifier. The dedicated PRACH preamble can be dedicatedly signaled to a UE similar to LTE RRC parameter ra-PreambleIndex. Time-frequency resource for the dedicated BFRQ preamble transmission can be shared with normal PRACH resource in FDM or in CDM manner. In both cases, BFRQ transmission takes place in RACH symbols. In FDM case, additional signaling on whereabouts of PRACH time-frequency resources is required. BFRQ time-frequency resources can be a subset of all RACH symbols. From UE perspective, BFRQ time-frequency resources can be a subset of all RACH symbols. This can be signaled by e.g., a time constraint pattern in RRC similar to LTE RRC parameter ra-PRACH-MaskIndex.

Figure 7:
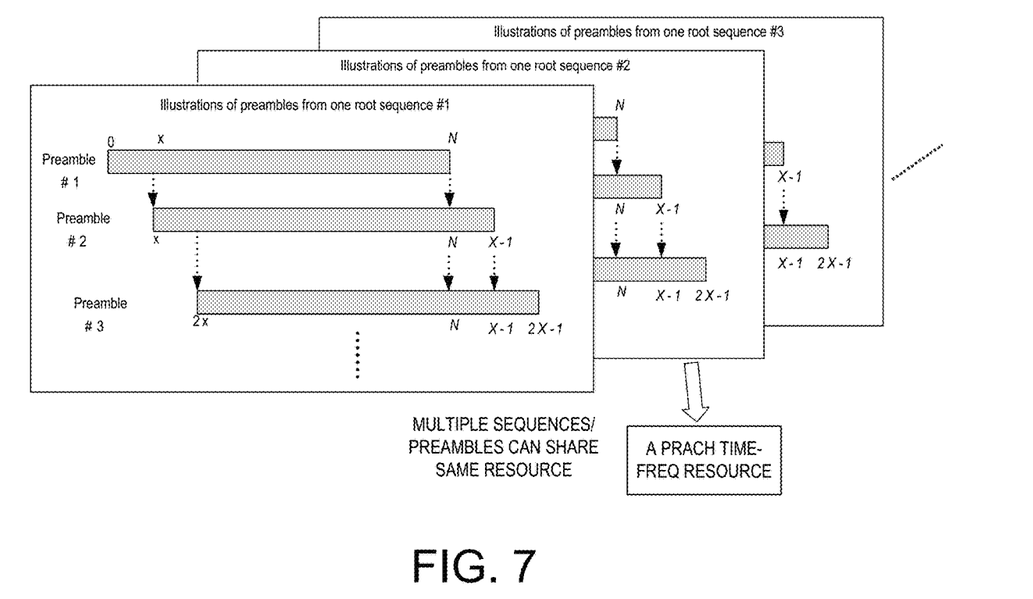
FIG. 7 illustrates a first embodiment of BFRQ transmission and resource configuration carried by dedicated high-layer signaling.

FIG. 7 illustrates a first embodiment of BFRQ transmission and resource configuration carried by dedicated high-layer signaling. In the first embodiment of FIG. 7, BFRQ resource is FDM'ed to normal PRACH resource. Dedicated signaling information can include: 1) whereabouts of PRACH time-frequency resources including a time constraint pattern similar to LTE RRC parameter ra-PRACH-MaskIndex and a frequency offset indication indicating which PRACH resource is used for the specified PRACH time slots; 2) Preamble index, similar to LTE RRC parameter ra-PreambleIndex; 3) Cyclic shift value for deriving assigned preamble, similar to LTE RRC parameter zeroCorrelationZoneConfig; 4) A starting root sequence to start counting preamble index for BFRQ, similar to LTE RRC parameter rootSequenceIndex (optional)—The indicated Preamble index is counted starting from the sequence indicated by rootSequenceIndex, based on the cyclic shift value indicated in zeroCorrelationZoneConfig. From UE perspective, the parameters above can be UE-specific parameters, i.e., the parameter values are the same for the dedicated PRACH resources configured for the set of DL RS(s) used for candidate beam identification purpose.

Figure 8:
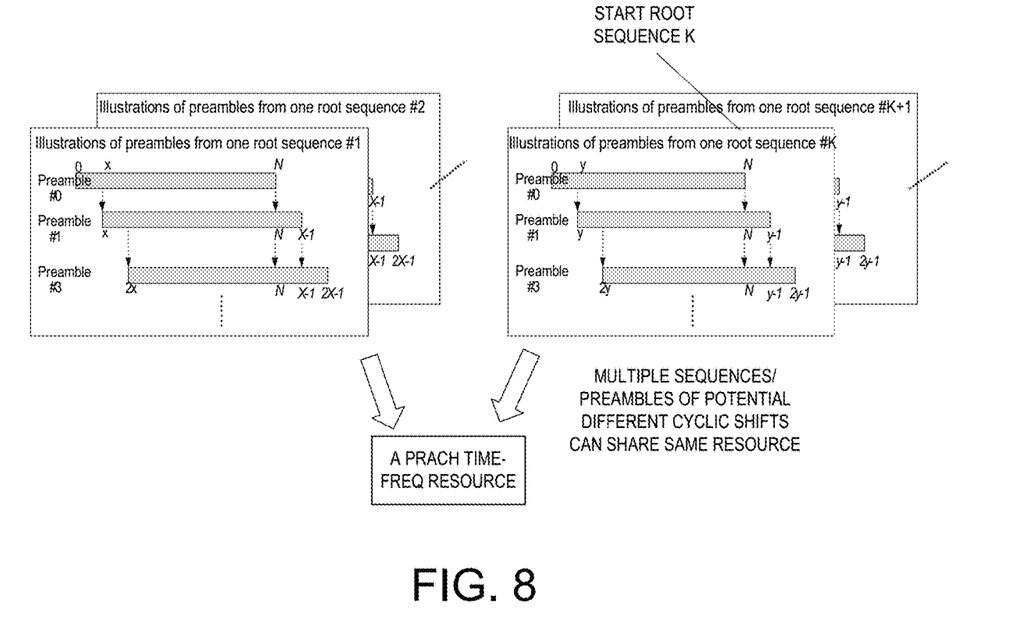
FIG. 8 illustrates a second embodiment of BFRQ transmission and resource configuration carried by dedicated high-layer signaling.

FIG. 8 illustrates a second embodiment of BFRQ transmission and resource configuration carried by dedicated high-layer signaling. In the first embodiment of FIG. 8, BFRQ resource is CDM'ed to normal PRACH resource. Dedicated signaling information can include: 1) Whereabouts of PRACH time-frequency resources including A time constraint pattern similar to LTE RRC parameter ra-PRACH-MaskIndex and A frequency offset indication indicating which PRACH resource is used for the specified PRACH time slots (optional); 2) Preamble index, similar to LTE RRC parameter ra-PreambleIndex; 3) Cyclic shift value for deriving assigned preamble, similar to LTE RRC parameter zeroCorrelationZoneConfig; 4) A starting root sequence to start counting preamble index for BFRQ, similar to LTE RRC parameter rootSequenceIndex—The indicated Preamble index is counted starting from the sequence indicated by rootSequenceIndex, based on the cyclic shift value indicated in zeroCorrelationZoneConfig. From UE perspective, these can be UE-specific parameters, i.e., the parameter values are the same for the dedicated PRACH resources configured for the set of DL RS(s) used for candidate beam identification purpose.

BFRQ transmission based on non-contention PRACH channel follows similar transmission behavior as normal PRACH msg1 transmission for NR initial access, but with potentially different parameter values. Similar retransmission behavior but can be independent configuration for maximum number of transmissions (i.e., similar to LTE RRC parameter PreambleTransMax). Similar power-ramping behavior but can be independent configuration for power ramping step (i.e., similar to LTE RRC parameter PowerRampingStep). Note that additional power ramping counter for counter the maximum number of power ramp attempts can be used. In this case, ramped power is based on the power ramping counter, but not based on the number of preamble transmissions.

Transition Phase for Beam Management

Beam failure recovery is a transitional situation, and initial beam alignment is required following such transitional situations to facilitate CONNECTED mode beam management. The transitional situations include: initial access from IDLE to CONNECTED, handover, radio link failure leading to RRC connection re-establishment, and sudden BPL blockage leading to beam failure. When UE recovers from the above-mentioned scenarios, but before NW can provide regular beam indication signaling, a default beam pair link is required for NW-UE communication. The default beam pair link includes a TX beam and a RX beam, which requires common understanding at both NW and UE to construct a valid default beam pair link.

Figure 9:
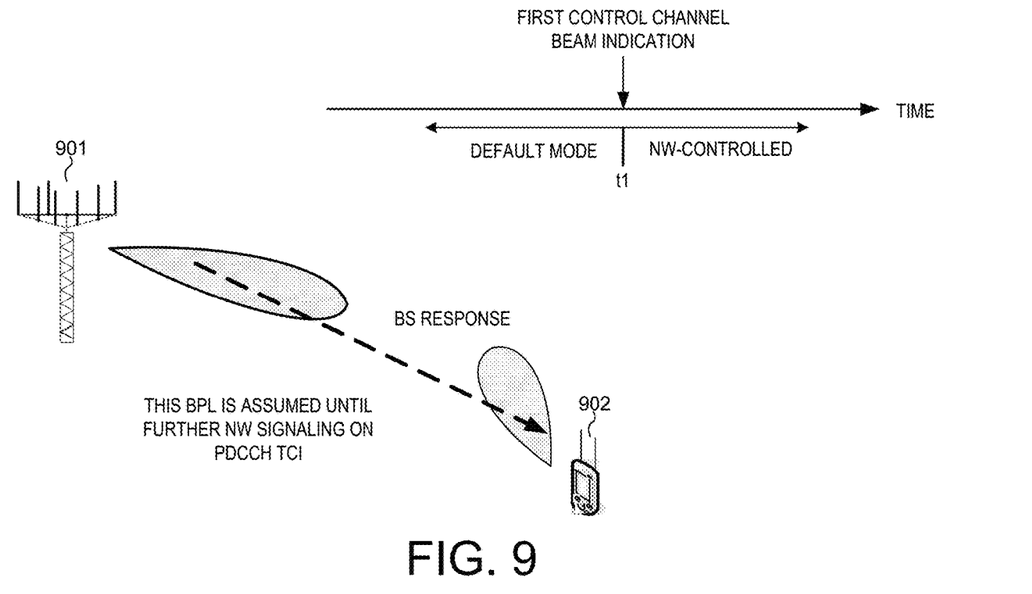
FIG. 9 illustrates the concept of a default mode beam pair link (BPL) before UE receiving a first control channel beam indication.

FIG. 9 illustrates the concept of a default mode beam pair link (BPL) before UE receiving a first control channel beam indication. As illustrated in FIG. 9, before the first control channel beam indication signaling at time t1, control and data channel beams are UE-connected, where a default mode beam management is needed. Under default mode operation, UE simply makes its own decision on which beam should be use for receiving candidate BPL first, and then apply the same beam for receiving the UE-specific PDCCH. In the default mode operation, NW never indicate which beam should be used for receiving UE-specific PDCCH. After the first control channel beam indication signaling at time t1, control and data channel beams are NW-controlled. Under NW controlled operation, UE simply follows NW's indication on which beam to use. Beam indication aims at signaling UE about RX spatial parameters for later reception in DL direction, and signaling UE about TX spatial parameters for later transmission in UL direction. Beam indication can be a map between indices and resource IDs. For example, resource IDs can be SS-block time index, CSI-RS resource ID, or SRS resource ID.

When beam management operates normally, a DL beam indication map is maintained between NW and UE. Based on beam-related reporting, preferred NW TX beams are selected as potential links for communicating with UE. UE report indicates BM RS measurements with preferred strength. The report indicates a subset of BM RS resources by e.g., resource indices, and NW can map the reported BM RS resources back to the NW TX beams used for transmitting on the reported BM RS resources. The selected links are tagged with different beam indication states/values. Beam indication states signaling provides association between the selected links (in terms of BM RS resources) and beam indication states.

Upon radio link failure (RLF), handover (HO), beam failure, corresponding procedures are taken to re-build connection with NW. In the example of FIG. 9, UE 902 detects a beam failure, identifies a candidate BPL through which UE 902 transmits the BFRQ message to BS 901. BS 901 transmits a BS response back to UE 902 and attempts connection with UE 902 in UE-indicated BPL. When beam failure recovery is successfully completed, UE assumes the DMRS ports of UE-specific PDCCH to be spatially QCL-ed with corresponding DL RS ports of the identified candidate BPL through which UE transmits the BFRQ and successful beam failure recovery is resulted. This means the spatial receive filter used by UE for receiving the transmission based on the identified candidate BPL can be used for receiving the UE-specific PDCCH. Optionally, DMRS ports of UE-specific PDSCH can be assumed to be spatially QCL-ed with the same corresponding DL RS ports. Before first control beam indication is signaled, measurement on SS-block and/or CSI-RS is executed and the results are reported to NW for further beam determination. After first control channel beam indication, the control and data channel beams are controlled by NW.

Figure 10:
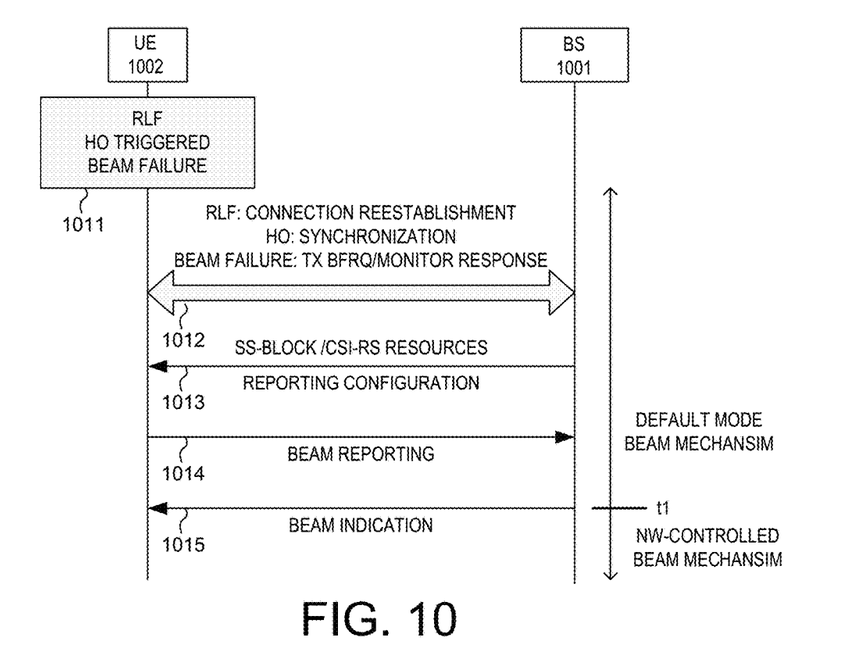
FIG. 10 illustrates default mode beam mechanism after beam failure recovery procedure in accordance with one novel aspect.

FIG. 10 illustrates default mode beam mechanism after RLF or HO or beam failure recovery procedure in accordance with one novel aspect. In step 1011, UE 1002 declares radio link failure, or triggers handover, or detects beam failure and identifies candidate beam. In step 1012, UE 1002 performs corresponding procedures. For RLF, UE performs cell selection and RRC connection reestablishment via 4-step RACH. For HO, UE performs synchronization via 4-step or 2-step RACH. For beam failure, UE performs beam failure recovery procedure where UE transmits BFRQ and monitors BS response. In step 1013, BS 1001 configures SS-block/CSI-RS resources and reporting configuration. In step 1014, UE 1002 sends beam reporting to BS 1001. After successfully re-building connection, UE assumes the DMRS port(s) of UE-specific PDCCH to be spatially QCL-ed with the reference signals identified during corresponding procedure. For RLF, it is the SS-block block that is identified during cell search and cell selection and then used for identifying RACH resource for accessing NW. For HO, it is the mobility RS utilized for identifying RACH resources in handover. For beam failure recovery, it is the corresponding DL RS port(s) of the identified candidate beam through which UE transmitted beam failure recovery request and successful beam failure recovery is resulted. In step 1015, BS 1001 sends beam indication signaling, the control and data channel beams are controlled by NW.

Figure 11:
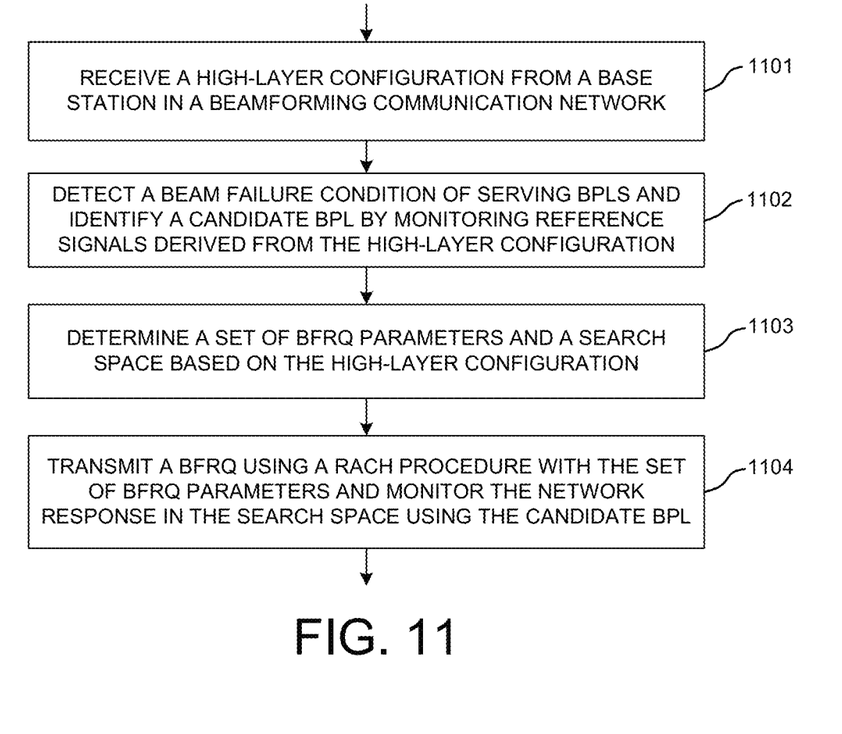
FIG. 11 is a flow chart of a method of beam failure recovery in a beamforming system in accordance with one novel aspect.

FIG. 11 is a flow chart of a method of beam failure recovery in a beamforming system in accordance with one novel aspect. In step 1101, a UE receives a high-layer configuration from a base station in a beamforming communication network. In step 1102, the UE detects a beam failure condition of serving beam pair links (BPLs) and identifying a candidate beam pair links by monitoring reference signals derived from the high-layer configuration. In step 1103, the UE determines a set of beam failure recovery request (BFRQ) parameters and a search space based on the high-layer configuration. In step 1104, the UE transmits a BFRQ using a random-access channel (RACH) procedure with the set of BFRQ parameters and monitoring the network response in the search space using the candidate BPL.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving a high-layer configuration from a base station by a user equipment (UE) in a beamforming communication network;
detecting a beam failure condition of serving beam pair link(s) and identifying a candidate beam pair link (BPL) by monitoring reference signals derived from the high-layer configuration;
determining a set of beam failure recovery request (BFRQ) parameters and a search space based on the high-layer configuration; and
transmitting a BFRQ using a random-access channel (RACH) procedure with the set of BFRQ parameters and monitoring the network response in the search space using the candidate BPL, wherein a preamble sequence for BFRQ transmission using the RACH procedure is determined from a preamble index for determining a preamble format, a cyclic shift value for deriving the preamble sequence from a root sequence, and a preamble root sequence index for obtaining the root sequence, and wherein the preamble index, the cyclic shift value and the preamble root sequence are provided by the high-layer configuration for transmitting the BFRQ.

2. The method of claim 1, wherein the high-layer configuration indicates the BFRQ parameters comprising at least one of: a time-frequency resource, an association between the BFRQ parameters and a configured reference signal for the candidate BPL, and pathloss information for the BFRQ.

3. The method of claim 2, wherein the time-frequency resource for BFRQ transmission is frequency domain multiplexed (FDM) with a set of time-frequency resources used for normal RACH procedure.

4. The method of claim 2, wherein the preamble sequence for BFRQ transmission is code domain multiplexed (CDM) with other preamble sequences for normal RACH procedure.

5. The method of claim 1, wherein the UE searches for a UE-specific control channel in the search space that is associated to the identified candidate BPL.

6. The method of claim 5, wherein the UE-specific control channel is addressed to a Cell-Radio Network Temporary Identifier (C-RNTI).

7. The method of claim 5, wherein the high-layer configuration indicates a control resource set (CORESET) specifically configured for monitoring the network response.

8. The method of claim 1, further comprising:
operating in a default mode beam mechanism after receiving the network response from the search space; and
operating in a network-controlled beam mechanism upon subsequently receiving a signaling related to a control channel beam indication from the base station.

9. The method of claim 8, wherein the UE assumes reference signals of a UE-specific control channel to be spatially Quasi-co-located with reference signals of the candidate BPL.

10. The method of claim 8, wherein the control channel beam indication provides UE on RX beams for subsequent downlink reception.

11. A User Equipment (UE), comprising:
a receiver that receives a high-layer configuration from a base station by a user equipment (UE) in a beamforming communication network;
a beam monitor that detects a beam failure condition of serving beam pair links and identifying a candidate beam pair link (BPL) by monitoring reference signals derived from the high-layer configuration;
a beam failure recovery circuit that determines a set of beam failure recovery request (BFRQ) parameters and a search space based on the high-layer configuration; and
a transmitter that transmits a BFRQ using a random-access channel (RACH) procedure with the set of BFRQ parameters and monitoring the network response in the search space using the candidate BPL, wherein a preamble sequence for BFRQ transmission using the RACH procedure is determined from a preamble index for determining a preamble format, a cyclic shift value for deriving the preamble sequence from a root sequence, and a preamble root sequence index for obtaining the root sequence, and wherein the preamble index, the cyclic shift value and the preamble root sequence are provided by the high-layer configuration for transmitting the BFRQ.

12. The UE of claim 11, wherein the high-layer configuration indicates the BFRQ parameters comprising at least one of: a time-frequency resource, an association between the BFRQ parameters and a configured reference signal for the candidate BPL, and pathloss information for the BFRQ.

13. The UE of claim 12, wherein the time-frequency resource for BFRQ transmission is frequency domain multiplexed (FDM) with a set of time-frequency resources used for normal RACH procedure.

14. The UE of claim 12, wherein the preamble sequence for BFRQ transmission is code domain multiplexed (CDM) with other preamble sequences for normal RACH procedure.

15. The UE of claim 11, wherein the UE searches for a UE-specific control channel in the search space that is associated to the identified candidate BPL.

16. The UE of claim 15, wherein the UE-specific control channel is addressed to a Cell-Radio Network Temporary Identifier (C-RNTI).

17. The UE of claim 15, wherein the high-layer configuration indicates a control resource set (CORESET) specifically configured for monitoring the network response.

18. The UE of claim 11, wherein the UE operates in a default mode beam mechanism after receiving the network response from the search space, and wherein the UE operates in a network-controlled beam mechanism upon subsequently receiving a signaling related to a control channel beam indication from the base station.

19. The UE of claim 18, wherein the UE assumes reference signals of a UE-specific control channel to be spatially Quasi-co-located with reference signals of the candidate BPL.

20. The UE of claim 18, wherein the control channel beam indication provides UE on RX beams for subsequent downlink reception.

* * * * *